US011554349B2

(12) United States Patent
Choi et al.

(10) Patent No.: US 11,554,349 B2
(45) Date of Patent: Jan. 17, 2023

(54) NANOFIBER MEMBRANE AND METHOD FOR MANUFACTURING THE SAME

(71) Applicant: GWANGJU INSTITUTE OF SCIENCE AND TECHNOLOGY, Gwangju (KR)

(72) Inventors: Hee Chul Choi, Gwangju (KR); So Young Kim, Gwangju (KR); Yejin Liang, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 139 days.

(21) Appl. No.: 17/318,405

(22) Filed: May 12, 2021

(65) Prior Publication Data

US 2021/0354090 A1 Nov. 18, 2021

(30) Foreign Application Priority Data

May 14, 2020 (KR) .................. 10-2020-0057767

(51) Int. Cl.
*B01D 69/02* (2006.01)
*C08J 7/04* (2020.01)
(Continued)

(52) U.S. Cl.
CPC .......... *B01D 69/02* (2013.01); *B01D 17/045* (2013.01); *B01D 67/0002* (2013.01);
(Continued)

(58) Field of Classification Search
CPC .. B01D 69/02; B01D 17/045; B01D 67/0002; B01D 71/68; B01D 71/70;
(Continued)

(56) References Cited

U.S. PATENT DOCUMENTS

2009/0032475 A1* 2/2009 Ferrer ................... B01D 17/04
428/338
2019/0351374 A1* 11/2019 Kumar ............... B01D 67/0006

FOREIGN PATENT DOCUMENTS

KR 10-2016-0137624 A 11/2016

OTHER PUBLICATIONS

Yejin Liang et al., "Omni-Directional Protected Nanofiber Membranes by Surface Segregation of PDMS-Terminated Triblock Copolymer for High-Efficiency Oil/Water Emulsion Separation", ACS Applied Materials & Interfaces, 12, 2020, pp. 25324-25333, published on May 7, 2020.

* cited by examiner

*Primary Examiner* — Krishnan S Menon
(74) *Attorney, Agent, or Firm* — Bridgeway IP Law Group, PLLC; Jihun Kim

(57) ABSTRACT

A nanofiber membrane includes a polymer nanofiber; and an amphiphilic triblock copolymer bonded to the surface of the polymer nanofiber, the amphiphilic triblock copolymer includes a hydrophobic portion; hydrophilic portions positioned at both ends of the hydrophobic portion; and a low surface energy portion positioned at one end of each of the hydrophilic portions positioned at both ends of the hydrophobic portion, and the hydrophobic portion of the amphiphilic triblock copolymer is bonded to the surface of the polymer nanofiber and the hydrophilic portion and the low surface energy portion are exposed to the outside of the surface of the polymer nanofiber. The membrane simultaneously exhibits hydrophilicity, underwater oleophobicity, and low oil adhesion force, thus has surface segregation properties, and as a result, has an excellent oil permeate flux, exhibits antifouling properties, and can excellently separate oil in water.

16 Claims, 12 Drawing Sheets

(51) Int. Cl.
  *B01D 71/68* (2006.01)
  *B01D 67/00* (2006.01)
  *B01D 71/70* (2006.01)
  *C02F 1/40* (2006.01)
  *C02F 1/44* (2006.01)
  *B01D 17/04* (2006.01)
  *C08L 81/06* (2006.01)
  *C02F 101/32* (2006.01)

(52) U.S. Cl.
  CPC ............. *B01D 71/68* (2013.01); *B01D 71/70* (2013.01); *C02F 1/40* (2013.01); *C02F 1/44* (2013.01); *C08J 7/0427* (2020.01); *C08L 81/06* (2013.01); *B01D 2323/02* (2013.01); *B01D 2323/04* (2013.01); *B01D 2323/39* (2013.01); *B01D 2325/36* (2013.01); *B01D 2325/38* (2013.01); *C02F 2101/32* (2013.01); *C08J 2381/06* (2013.01); *C08J 2471/02* (2013.01); *C08J 2483/04* (2013.01); *C08L 2203/12* (2013.01)

(58) Field of Classification Search
  CPC ............ B01D 2323/02; B01D 2323/04; B01D 2323/39; B01D 2325/36; B01D 2325/38; B01D 17/085; B01D 67/0004; B01D 71/34; B01D 71/40; B01D 71/44; B01D 71/52; B01D 71/80; B01D 17/0202; B01D 17/047; B01D 65/08; B01D 67/0095; B01D 2325/20; C02F 1/40; C02F 1/44; C02F 2101/32; C02F 1/444; C02F 2101/325; C08J 7/0427; C08J 2381/06; C08J 2471/02; C08J 2483/04; C08L 81/06; C08L 2203/12
  See application file for complete search history.

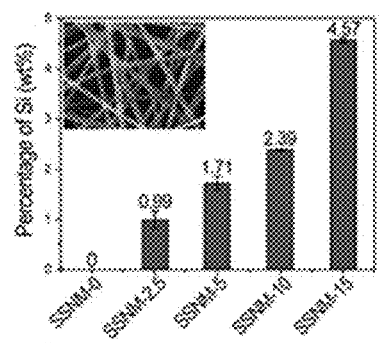
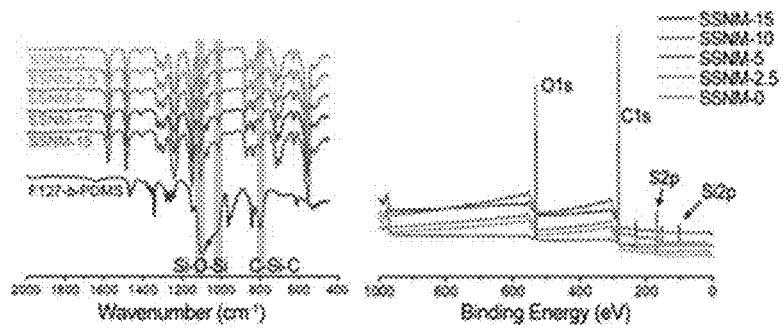
FIG. 6A  FIG. 6B  FIG. 6C
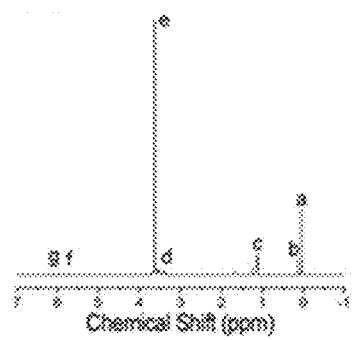
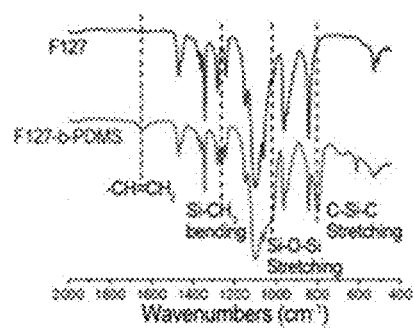
FIG. 6D  FIG. 6E
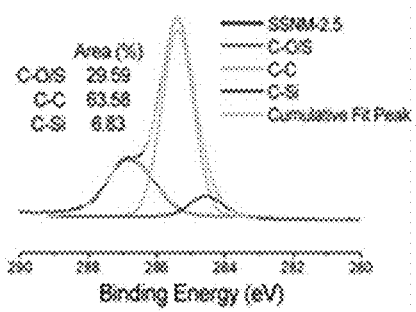
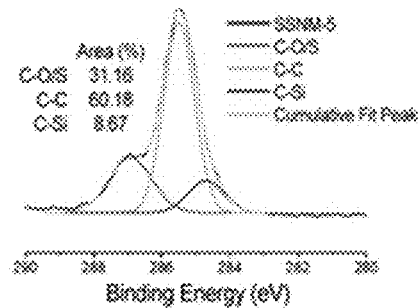
FIG. 6F  FIG. 6G

NANOFIBER MEMBRANE AND METHOD FOR MANUFACTURING THE SAME

BACKGROUND OF THE INVENTION

Field of the Invention

The present invention relates to a nanofiber membrane and a method for manufacturing the same.

Description of the Related Art

In situations where water purification technology is required in order to cope with water pollution such as industrial wastewater spill or oil spill accidents, there is a growing demand particularly for the separation of substances in water/oil emulsion forms. In the emulsion form, the oil is separated into small droplets having a size of less than 20 μm, and it has been thus difficult to separate such small-sized oil by the conventional treatment.

In order to solve this problem, to use a membrane to which microfiltration (MF) or ultrafiltration (UF) is applied may be a favorable method since the membrane exhibits an excellent separation efficiency, is economical, and does not require complicated operating conditions. However, particularly in the hydrophobic membrane, there is a problem of having a low membrane permeation amount and a high transmembrane pressure due to contamination of the membrane.

In addition, existing membranes have the potential to pollute the environment or harm health when fluorine (F) is contained as in fluorinated polyvinylidene (PVDF).

It is required to develop a water/oil separation membrane that is environmentally friendly, exhibits antifouling properties, is resistant to contamination, and has a high permeate flux.

Citation List

Patent Literature

Patent Literature 1: Korean Laid-Open Patent Publication No. 10-2016-0137624

SUMMARY OF THE INVENTION

The technical object to be achieved by the present invention is to provide a nanofiber membrane exhibiting antifouling properties and a method for manufacturing the same.

The technical object to be achieved by the present invention is not limited to the technical object mentioned above, and other technical objects that are not mentioned will be clearly understood by those skilled in the art to which the present invention pertains from the following description.

In order to achieve the technical object, an embodiment of the present invention provides a nanofiber membrane.

In an embodiment of the present invention, the nanofiber membrane includes a polymer nanofiber; and an amphiphilic triblock copolymer bonded to the surface of the polymer nanofiber, the amphiphilic triblock copolymer includes a hydrophobic portion; hydrophilic portions positioned at both ends of the hydrophobic portion; and a low surface energy portion positioned at one end of each of the hydrophilic portions positioned at both ends of the hydrophobic portion, and the hydrophobic portion of the amphiphilic triblock copolymer is bonded to the surface of the polymer nanofiber and the hydrophilic portion and the low surface energy portion are exposed to the outside of the surface of the polymer nanofiber.

In an embodiment of the present invention, the polymer nanofiber may include a polysulfone-based polymer.

In an embodiment of the present invention, the hydrophobic portion of the amphiphilic triblock copolymer may be one selected from the group consisting of poly(propylene oxide) (PPO), polyvinylidene fluoride (PVDF), and polysulfone (PSF).

In an embodiment of the present invention, the hydrophilic portion of the amphiphilic triblock copolymer may be one selected from the group consisting of poly(ethylene oxide) (PEO), polyvinylpyrrolidone (PVP), and polymethacrylic acid (PMAA).

In an embodiment of the present invention, the low surface energy portion of the amphiphilic triblock copolymer may be one selected from the group consisting of polydimethylsiloxane (PDMS), poly(hexafluorobutyl methacrylate) (PHFBM), poly(hexafluorobutyl acrylate) (PHFBA), and poly(dodecafluoroheptyl methacrylate) (PDFHM).

In an embodiment of the present invention, the weight ratio of the polymer nanofiber to the amphiphilic triblock copolymer may be 1:0.025 to 1:0.15.

In an embodiment of the present invention, the ratio occupied by the low surface energy portion may be 5% to 20% of the entire surface area of the polymer nanofiber.

In an embodiment of the present invention, the amphiphilic triblock copolymer may have a water contact angle of 50° or less and an underwater oil contact angle of 110° or more.

In order to achieve the technical object, another embodiment of the present invention provides a method for manufacturing a nanofiber membrane.

In an embodiment of the present invention, the method for manufacturing a nanofiber membrane includes mixing an amphiphilic triblock copolymer and a polymer material with an organic solvent to form a mixture; subjecting the mixture to electrospinning to form a nanofiber; and immersing the nanofiber in distilled water and then drying the nanofiber, and the amphiphilic triblock copolymer includes a hydrophobic portion; hydrophilic portions positioned at both ends of the hydrophobic portion; and a low surface energy portion positioned at one end of each of the hydrophilic portions positioned at both ends of the hydrophobic portion.

In an embodiment of the present invention, the hydrophobic portion of the amphiphilic triblock copolymer may be one selected from the group consisting of poly(propylene oxide) (PPO), polyvinylidene fluoride (PVDF), and polysulfone (PSF).

In an embodiment of the present invention, the hydrophilic portion of the amphiphilic triblock copolymer may be one selected from the group consisting of poly(ethylene oxide) (PEO), polyvinylpyrrolidone (PVP), and polymethacrylic acid (PMAA).

In an embodiment of the present invention, the low surface energy portion of the amphiphilic triblock copolymer may be one selected from the group consisting of polydimethylsiloxane (PDMS), poly(hexafluorobutyl methacrylate) (PHFBM), poly(hexafluorobutyl acrylate) (PHFBA), and poly(dodecafluoroheptyl methacrylate) (PDFHM).

In an embodiment of the present invention, the polymer material may include a polysulfone-based polymer.

In an embodiment of the present invention, the organic solvent may include one or more selected from the group consisting of N-methyl-2-pyrrolidone (NMP), dimethylformamide (DMF), dimethylsulfoxide (DMSO), and N,N-dimethylacetamide (DMAc).

In an embodiment of the present invention, the content of the amphiphilic triblock copolymer may be more than 0 wt % and 15 wt % or less with respect to the total weight of the mixture.

In an embodiment of the present invention, the content of the polymer material may be 20 wt % to 30 wt % with respect to the total weight of the mixture.

BRIEF DESCRIPTION OF THE DRAWINGS

FIGS. 6A to 6I are graphs illustrating the surface composition of surface segregation nanofiber membranes (SSNM) according to an embodiment of the present invention;

FIGS. 9A to 9F are graphs illustrating the permeate flux through SSNM in various situations according to an embodiment of the present invention.

DETAILED DESCRIPTION OF THE PREFERRED EMBODIMENTS

Figure 1:
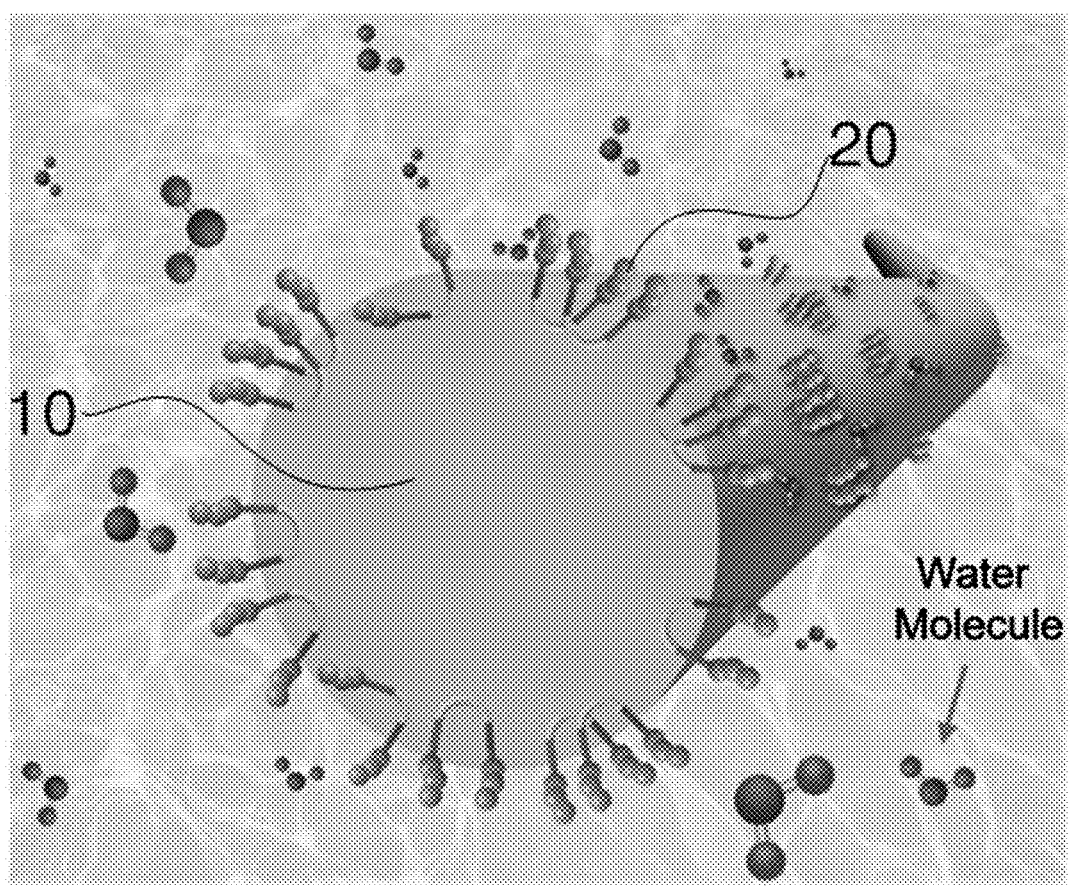
FIG. 1 is a schematic diagram of a nanofiber membrane according to an embodiment of the present invention.

Hereinafter, the present invention will be described with reference to the accompanying drawings. However, the present invention may be implemented in a number of different forms and therefore is not limited to the embodiments described herein. In the drawings, parts irrelevant to the description are omitted in order to clearly describe the present invention, and similar reference numerals are attached to similar parts throughout the specification.

Throughout the specification, when a part is said to be "connected (coupled, in contact, bonded)" with another part, this includes not only the case of being "directly connected" but also the case of being "indirectly connected" with another member interposed therebetween. In addition, when a part "includes" a certain component, this means that other components are not excluded but may be further provided unless specifically stated to the contrary.

The terms used in the present specification are only used to describe specific embodiments and are not intended to limit the present invention. Singular expressions include plural expressions unless the context clearly indicates otherwise. In the present specification, terms such as "include" or "have" are intended to designate the existence of features, numbers, steps, actions, components, parts, or combinations thereof described in the specification and should be understood as not precluding the possibility of existence or addition of one or more other features, numbers, steps, actions, components, parts, or combinations thereof.

A nanofiber membrane according to an embodiment of the present invention will be described.

FIG. 1 is a schematic diagram of a nanofiber membrane according to an embodiment of the present invention.

Figure 2:
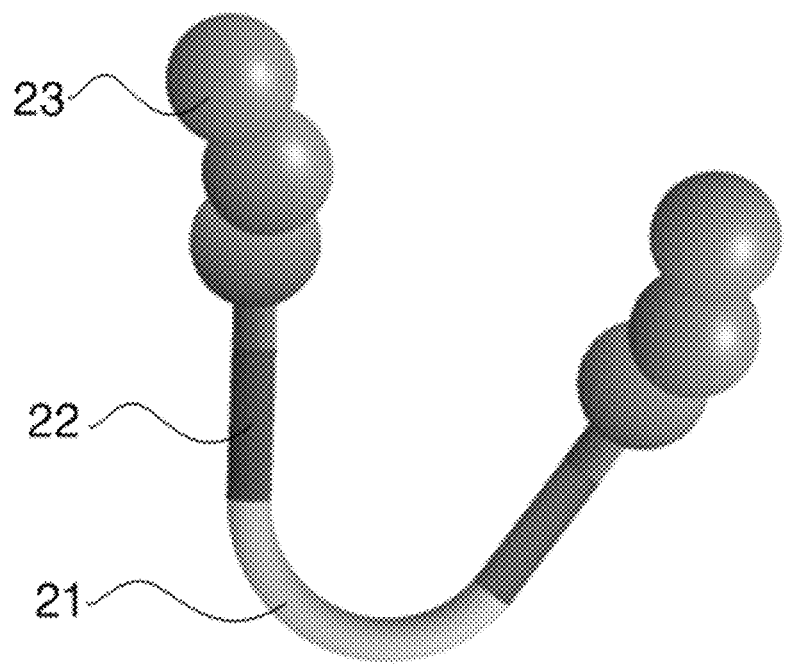
FIG. 2 is a schematic diagram of an amphiphilic triblock copolymer according to an embodiment of the present invention.

FIG. 2 is a schematic diagram of an amphiphilic triblock copolymer according to an embodiment of the present invention.

Referring to FIGS. 1 and 2, the nanofiber membrane according to an embodiment of the present invention includes a polymer nanofiber 10; and an amphiphilic triblock copolymer 20 bonded to the surface of the polymer nanofiber, the amphiphilic triblock copolymer 20 includes a hydrophobic portion 21; hydrophilic portions 22 positioned at both ends of the hydrophobic portion 21; and a low surface energy portion 23 positioned at one end of each of the hydrophilic portions 22 positioned at both ends of the hydrophobic portion 21, and the hydrophobic portion 21 of the amphiphilic triblock copolymer 20 is bonded to the surface of the polymer nanofiber 10 and the hydrophilic portion 22 and the low surface energy portion 23 are exposed to the outside of the surface of the polymer nanofiber 10.

The polymer nanofiber 10 may include a polysulfone-based polymer.

The polysulfone-based polymer may be any one selected from polysulfone (PS), polyethersulfone (PES), or any mixture thereof. The polymer is not limited to the polysulfone-based polymer as long as it is any polymer applicable to the nanofiber membrane of the present invention.

The amphiphilic triblock copolymer 20 may include a hydrophobic portion 21; hydrophilic portions 22 positioned at both ends of the hydrophobic portion 21; and a low surface energy portion 23 positioned at one end of each of the hydrophilic portions 22 positioned at both ends of the hydrophobic portion 21 (FIG. 2).

The amphiphilic triblock copolymer 20 may be bonded to the surface of the polymer nanofiber 10 to modify the surface of the polymer nanofiber 10.

The hydrophobic portion 21 of the amphiphilic triblock copolymer may be one selected from the group consisting of poly(propylene oxide) (PPO), polyvinylidene fluoride (PVDF), and polysulfone (PSF).

As the hydrophobic portion 21, PVDF may also be used but it may be more environmentally friendly to use PPO or PSF that does not contain fluorine.

The hydrophobic portion 21 is bonded to the surface of the polymer nanofiber 10 having a hydrophobic property and may serve to connect the amphiphilic triblock copolymer 20 to the polymer nanofiber 10.

The hydrophilic portion 22 of the amphiphilic triblock copolymer may be one selected from the group consisting of poly(ethylene oxide) (PEO), polyvinylpyrrolidone (PVP), and polymethacrylic acid (PMAA).

The hydrophilic portion 22 is positioned to be exposed to the outside of the surface of the polymer nanofiber 10. The hydrophilic portion 22 can improve permeate flux and prevent the oil droplets from directly coming into contact with the polymer nanofiber 10 by forming a hydration layer on the surface of the polymer nanofiber 10.

The low surface energy portion 23 of the amphiphilic triblock copolymer may be one selected from the group consisting of polydimethylsiloxane (PDMS), poly(hexafluorobutyl methacrylate) (PHFBM), poly(hexafluorobutyl acrylate) (PHFBA), and poly(dodecafluoroheptyl methacrylate) (PDFHM).

The low surface energy portion 23 is exposed to the outside of the surface of the polymer nanofiber 10 and is positioned further outside than the hydrophilic portion 22. The low surface energy portion 23 may form a low surface energy layer on the surface of the polymer nanofiber 10 to decrease the adhesion force with oil (oleophobicity) and impart excellent antifouling properties.

For example, the hydrophobic portion 21 of the amphiphilic triblock copolymer 20 may be composed of PPO, the hydrophilic portion 22 may be composed of PEO, and the low surface energy portion 23 may be composed of PDMS.

For example, the amphiphilic triblock copolymer 20 may be F127-b-PDMS.

The weight ratio of the polymer nanofiber 10 to the amphiphilic triblock copolymer 20 may be 1:0.025 to 1:0.15. When the weight ratio is less than 1:0.025, the hydrophilicity and antifouling properties of the membrane may be insufficient. When the weight ratio exceeds 1:0.15, the pore size may become too large, thus the oil intrusion pressure may rather decrease, and the oil rejection may be lowered.

The nanofiber membrane according to an embodiment of the present invention manufactured to have the weight ratio may have a mean flow pore size of 1.5 µm to 2.5 µm. When the mean flow pore size is less than 1.5 µm, the content of the amphiphilic triblock copolymer may be low and the antifouling properties of the membrane may be weak. When the mean flow pore size exceeds 2.5 µm, the pore size may be larger than the oil droplets and the oil may not be filtered. The mean flow pore size may increase as the content of the amphiphilic triblock copolymer increases.

The ratio ($\Phi$PDMS) occupied by the low surface energy portion may be 5% to 20% of the entire surface area of the polymer nanofiber. The surface segregation properties may be higher as the ratio occupied by the low surface energy portion is greater. When the ratio ($\Phi$PDMS) occupied by the low surface energy portion is less than 5%, the content of the amphiphilic triblock copolymer may be low, thus the surface segregation properties may not be imparted, and the antifouling properties of the membrane may be weak. When the ratio ($\Phi$PDMS) occupied by the low surface energy portion exceeds 20%, the pore size may be larger than the oil droplets and the oil may not be filtered.

The amphiphilic triblock copolymer may have a water contact angle (WCA) of 50° or less and an underwater oil contact angle (UWOCA) of 110° or more. When the water contact angle exceeds 50°, the hydrophilicity may be weakened and thus the permeate flux may decrease. When the underwater oil contact angle is less than 110°, adhesion force may increase and thus the antifouling properties of the membrane may decrease.

A method for manufacturing a nanofiber membrane according to another embodiment of the present invention will be described.

Figure 3:
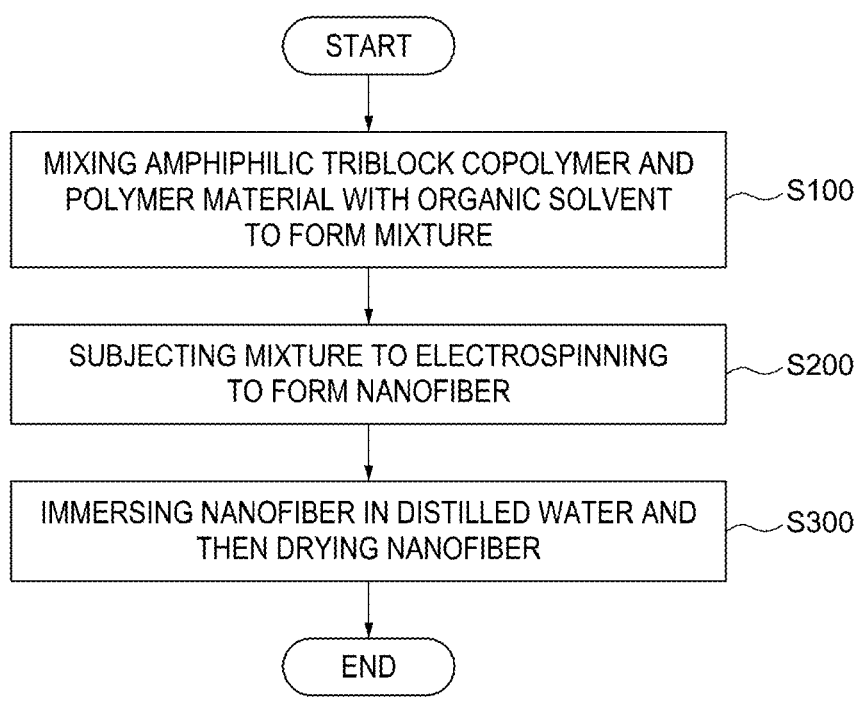
FIG. 3 is a flow chart of a method for manufacturing a nanofiber membrane according to an embodiment of the present invention.
Figure 4A:
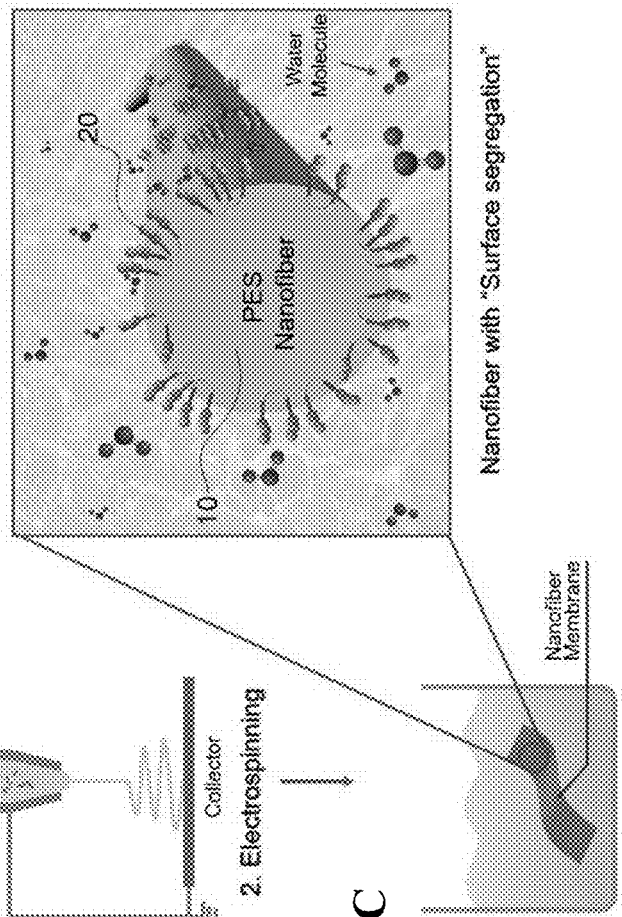
FIGS. 4A to 4D are schematic diagrams of a process of manufacturing and applying a nanofiber membrane according to an embodiment of the present invention.
Figure 4B:
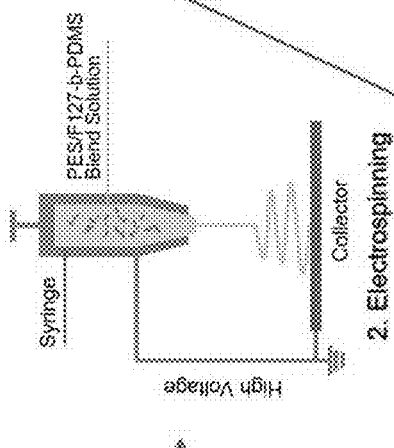
Figure 4C:
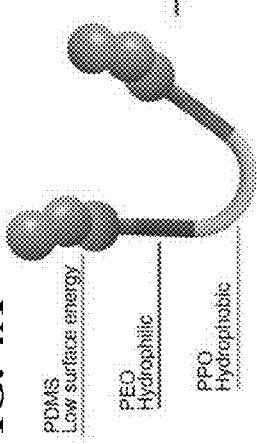
Figure 4D:
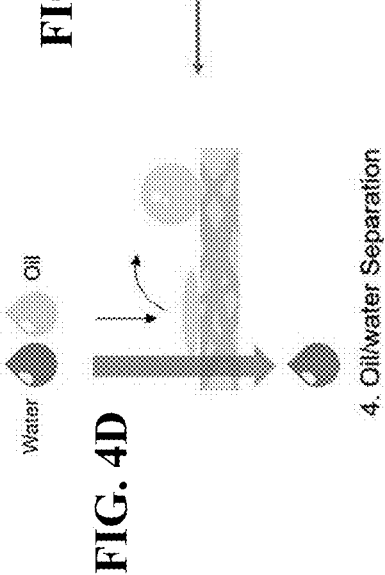
Figure 5A:
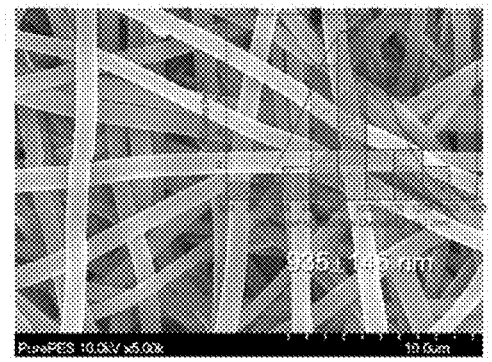
FIGS. 5A to 5F are SEM images and property graphs of nanofiber membranes depending on the content of F127-b-PDMS according to an embodiment of the present invention.
Figure 5B:
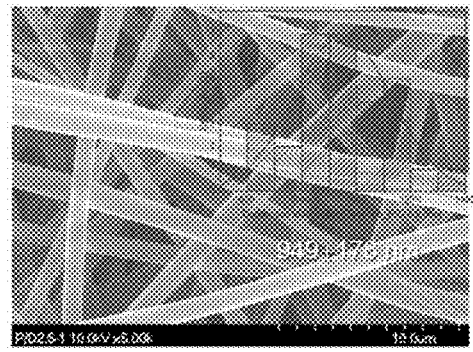
Figure 5C:
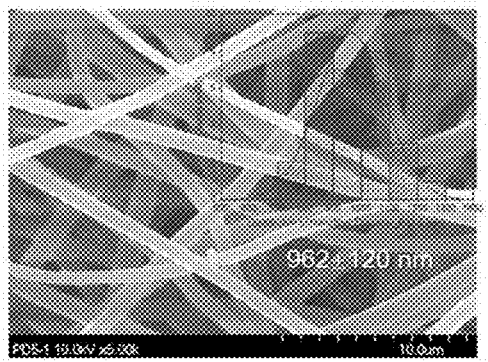
Figure 5D:
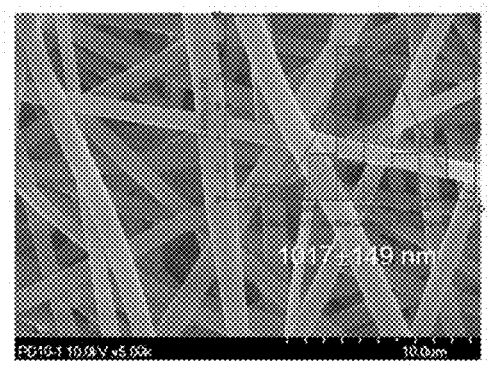
Figure 5E:
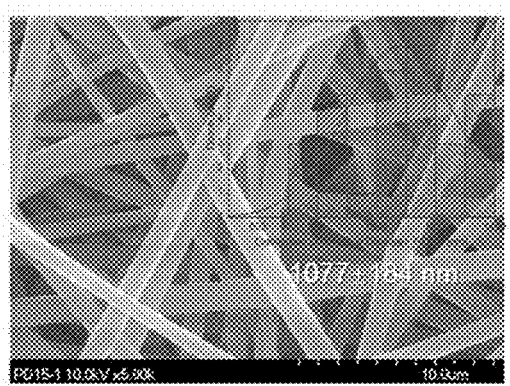
Figure 5F:
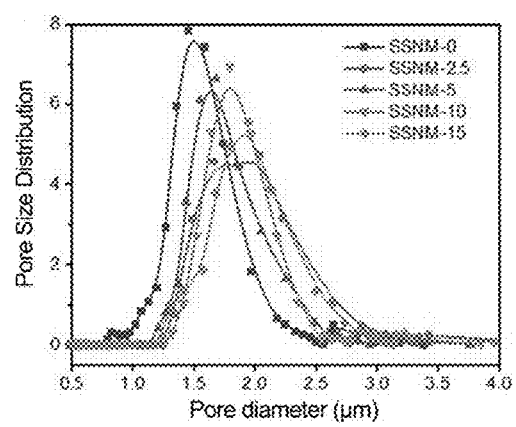
Figure 6H:
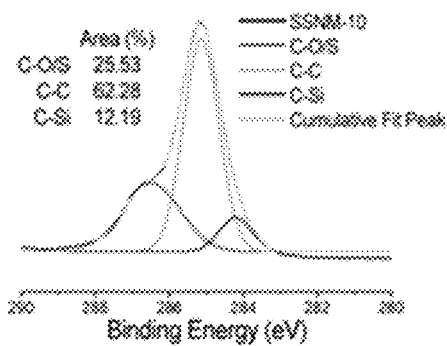
Figure 6I:
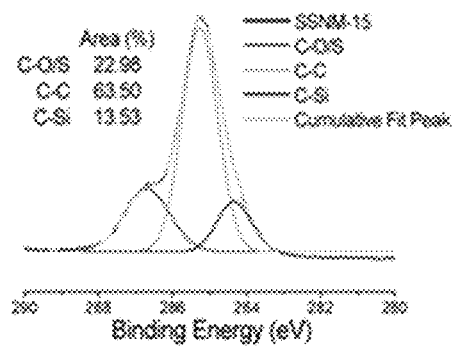
Figure 7A:
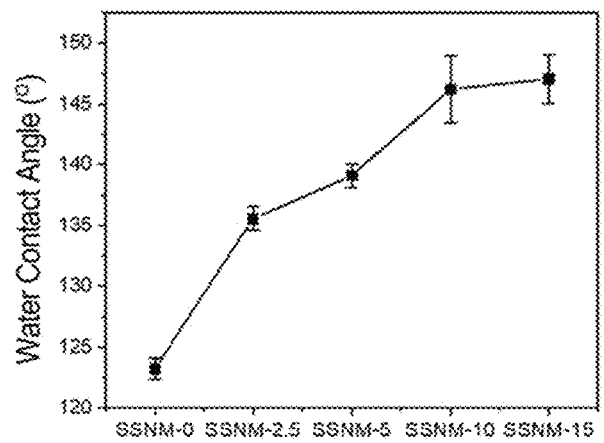
FIGS. 7A to 7F are graphs illustrating the selective wettability of surface segregation nanofiber membranes (SSNM) according to an embodiment of the present invention.
Figure 7B:
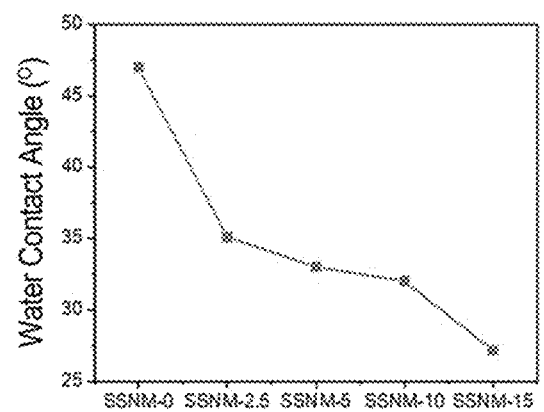
Figure 7C:
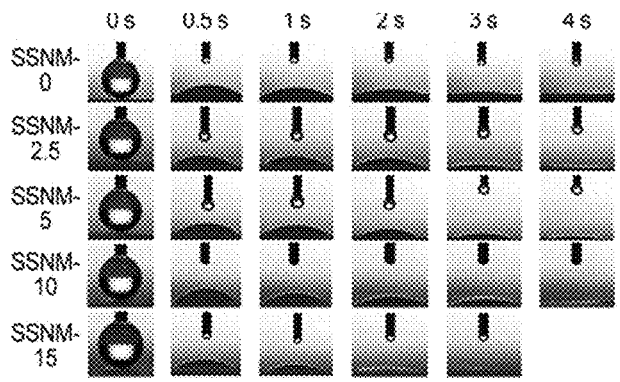
Figure 7D:
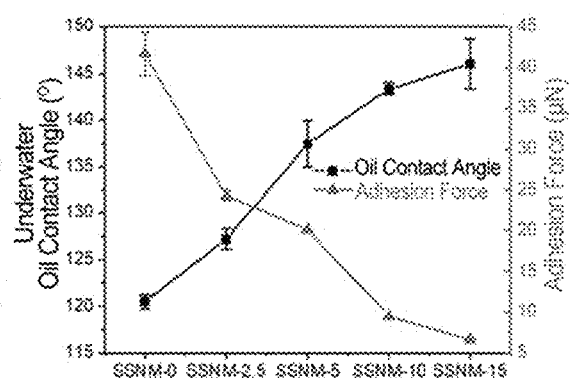
Figure 7E:
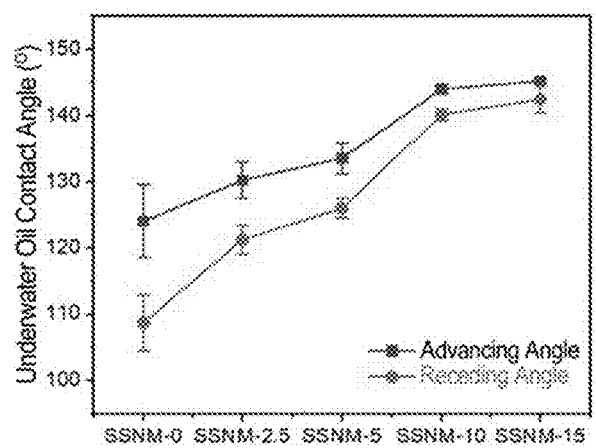
Figure 7F:
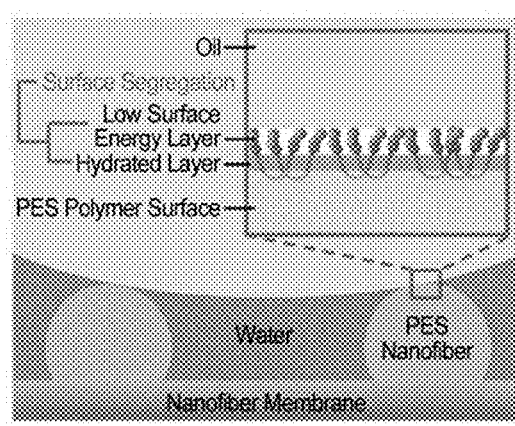
Figure 8A:
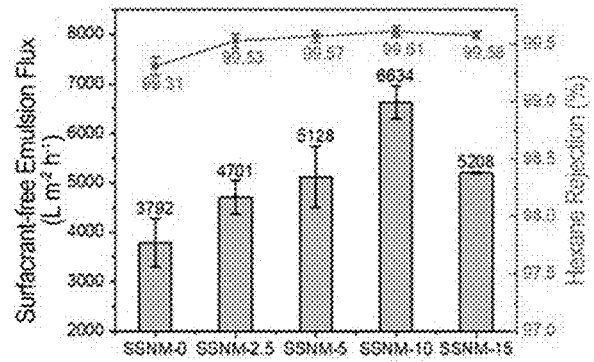
FIGS. 8A to 8E are graphs illustrating the oil-in-water emulsion separation performance of SSNM according to an embodiment of the present invention.
Figure 8B:
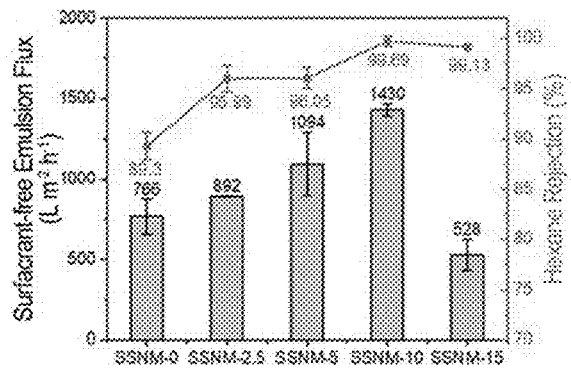
Figure 8C:
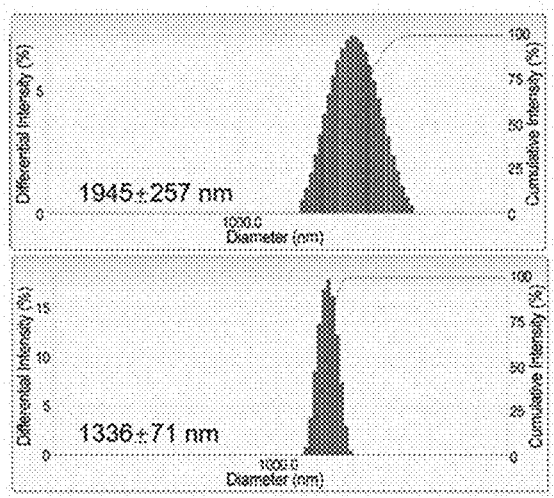
Figure 8D:
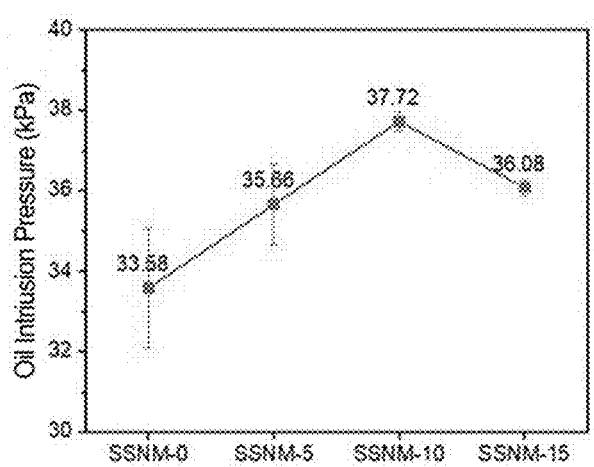
Figure 8E:
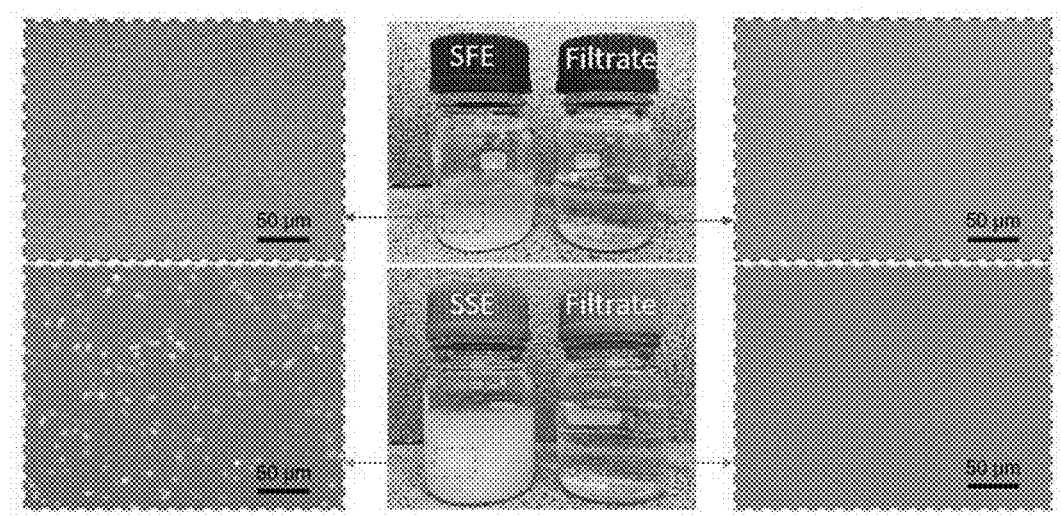
Figure 9B:
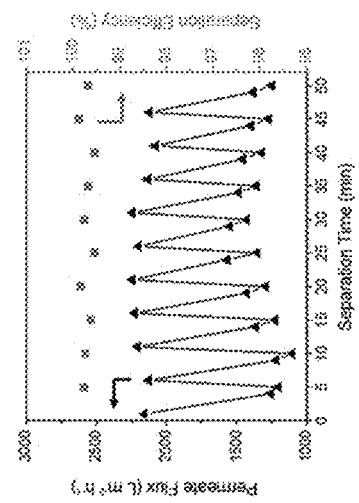
Figure 9A:
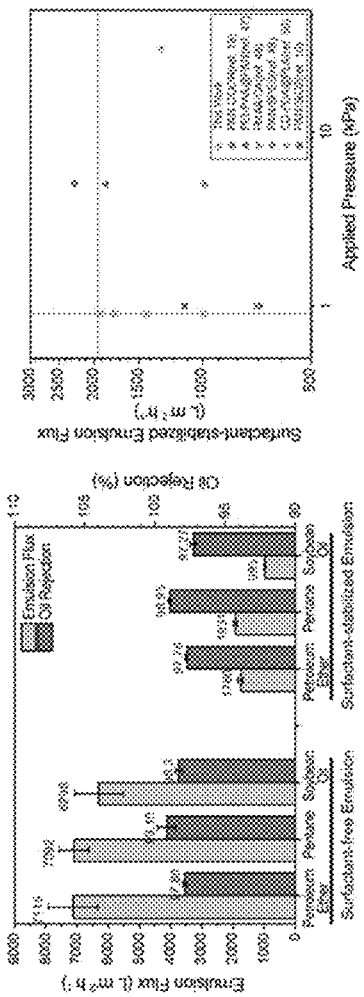
Figure 9C:
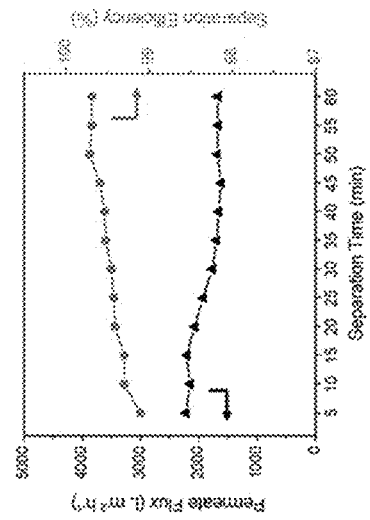
Figure 9E:
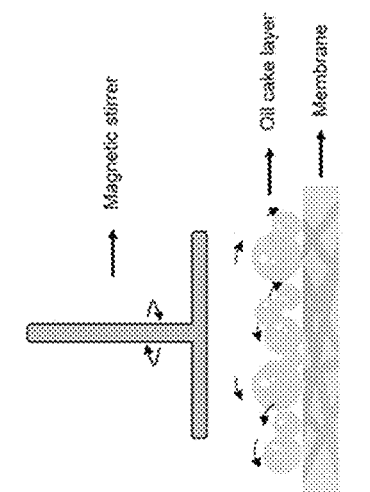
Figure 9F:
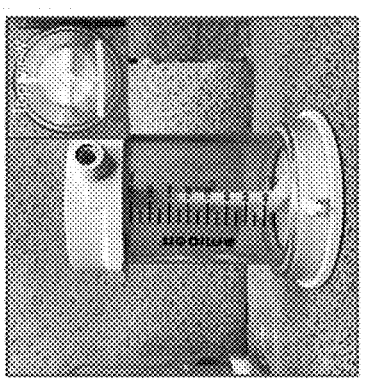

FIG. 3 is a flow chart of a method for manufacturing a nanofiber membrane according to an embodiment of the present invention.

FIGS. 4A to 4D are schematic diagrams of a process of manufacturing and applying a nanofiber membrane according to an embodiment of the present invention.

Referring to FIGS. 3 and 4A to 4D, the method for manufacturing a nanofiber membrane according to an embodiment of the present invention includes a step S100 of mixing an amphiphilic triblock copolymer and a polymer material with an organic solvent to form a mixture; a step S200 of subjecting the mixture to electrospinning to form a nanofiber; and a step S300 of immersing the nanofiber in distilled water and then drying the nanofiber, and the amphiphilic triblock copolymer includes a hydrophobic portion; hydrophilic portions positioned at both ends of the hydrophobic portion; and a low surface energy portion positioned at one end of each of the hydrophilic portions positioned at both ends of the hydrophobic portion.

In the first step, an amphiphilic triblock copolymer and a polymer material are mixed with an organic solvent to form a mixture (S100).

The amphiphilic triblock copolymer may include a hydrophobic portion; hydrophilic portions positioned at both ends of the hydrophobic portion; and a low surface energy portion positioned at one end of each of the hydrophilic portions positioned at both ends of the hydrophobic portion.

The hydrophobic portion of the amphiphilic triblock copolymer may be one selected from the group consisting of poly(propylene oxide) (PPO), polyvinylidene fluoride (PVDF), and polysulfone (PSF).

The hydrophilic portion of the amphiphilic triblock copolymer may be one selected from the group consisting of poly(ethylene oxide) (PEO), polyvinylpyrrolidone (PVP), and polymethacrylic acid (PMAA).

The low surface energy portion of the amphiphilic triblock copolymer may be one selected from the group consisting of polydimethylsiloxane (PDMS), poly(hexafluorobutyl methacrylate) (PHFBM), poly(hexafluorobutyl acrylate) (PHFBA), and poly(dodecafluoroheptyl methacrylate) (PDFHM).

For example, the hydrophobic portion of the amphiphilic triblock copolymer may be composed of PPO, the hydrophilic portion may be composed of PEO, and the low surface energy portion may be composed of PDMS.

For example, the amphiphilic triblock copolymer may be F127-b-PDMS.

The amphiphilic triblock copolymer may be formed through free radical polymerization, and the block copolymerization of CMS-V05 takes place by the oxidation-reduction reaction of two carbon atoms linked to a hydroxy group with Ce(IV) of an initiator at the end of the PEO chain.

For example, the amphiphilic triblock copolymer can be manufactured by emulsifying F127 and CMS-V05 through ultrasonication and performing extraction, dialysis, and freeze-drying.

The polymer material may include a polysulfone-based polymer.

The polysulfone-based polymer may be any one selected from polysulfone (PS), polyethersulfone (PES), or any mixture thereof. The polymer is not limited to the polysulfone-based polymer as long as it is any polymer applicable to the nanofiber membrane of the present invention.

The organic solvent may include one or more selected from the group consisting of N-methyl-2-pyrrolidone (NMP), dimethylformamide (DMF), dimethylsulfoxide (DMSO), and N,N-dimethylacetamide (DMAc).

For example, the organic solvent may be DMF:NMP mixed at a weight ratio of 1:1.

The content of the amphiphilic triblock copolymer may be more than 0 wt % and 15 wt % or less with respect to the total weight of the mixture. When the content of the amphiphilic triblock copolymer is 0 wt %, the surface segregation properties may not be imparted and thus the antifouling properties of the membrane may be weak. When the content of the amphiphilic triblock copolymer exceeds 15 wt %, the pore size may be larger than the oil droplets and the oil may not be filtered.

The content of the polymer material may be 20 wt % to 30 wt % with respect to the total weight of the mixture. When the content of the polymer material is less than 20 wt %, nanofibers may not be formed or the thickness thereof may not be constant. When the content of the polymer material exceeds 30 wt %, the viscosity of the mixture may be too high to cause spinning of fibers not occur or the fiber diameter (thickness) may be too large, thus the pore size may be larger than the oil droplets, and the oil may not be filtered.

The average diameter of the polymer nanofibers may be 700 nm to 1300 nm. As the content of the amphiphilic triblock copolymer increases, the viscosity of the mixed solution may increase due to the higher concentration, and thus the diameter of the nanofibers may increase. As the diameter of the fiber increases, the density of the nanofibers intersecting under a certain volume fraction of the copolymer decreases, and thus the pore size of the membrane is generally larger.

In the second step, the mixture is subjected to electrospinning to form nanofibers (S200).

Electrospinning is known as a technology in which a polymer solution or polymer melt is drawn to have a cross-sectional area of tens to hundreds of nanometers while moving to a grounded integrated plate through a nozzle of a reservoir by electrostatic force caused by a high voltage of several kV or more. In other words, when the externally applied electric field exceeds a certain threshold, the electric charge generated on the surface of the polymer solution extruded through the nozzle becomes greater than the surface tension of the polymer solution, and thus a liquid jet is generated. The microfiber thus formed is drawn into an ultrafine fiber via the electrically generated bending instability. The thickness of the fiber can be controlled by varying the size of the electric field and the concentration of the polymer solution in this process.

For example, electrospinning can be performed at a supply rate of 0.5 mL/h, an applied voltage of 10 kV to 12 kV, and a relative humidity of 50% to 60%.

In the third step, the nanofibers may be immersed in distilled water and then dried (S300).

When the nanofibers previously formed by electrospinning come into contact with water, diffusional exchange between the solvent and the non-solvent spontaneously occurs, and the concentration of hydrophilic portion is induced on the surface of the nanofiber membrane. The concentration of hydrophilic portion provides a strong dragging effect capable of moving the low surface energy portion onto the surface of the nanofiber. On the other hand, the hydrophobic portion tends to come into close contact with the polymer nanofiber. By performing drying thereafter, a nanofiber membrane having an oil/water surface segregation function may be manufactured.

For example, when 10 wt % of F127-b-PDMS and 25 wt % of PES are blended in DMF:NMP mixed at a weight ratio of 1:1, electrospinning is performed at a high voltage, and the nanofiber membrane is collected into a flat type collector covered with aluminum foil and then immersed in a deionized water bath, hydrophilic PEO and non-polar PDMS move to the PES nanofiber surface and hydrophobic PPO comes into close contact with the PES nanofiber.

Thereafter, the nanofiber membrane may be dried in an oven at 40° C. to manufacture a surface segregation nanofiber membrane.

In other words, the concept of surface segregation may be introduced into the nanofiber membrane through electrospinning technology. The surface of the membrane is modified by F127-b-PDMS of a triblock copolymer to cover the surface with hydrophilic PEO and non-polar PDMS segments forming a hydration layer and a low surface energy layer. By the synergistic effect of surface segregation, the obtained membrane exhibits excellent underwater oleophobicity and low oil adhesion force. The integration of the antifouling surface segregation and the electrospun nanofiber membrane not only impart excellent separation performance of emulsions with or without surfactants but also provide a promising permeate flux. The surface segregation nanofiber membrane with unique oil-resistance and oil release properties provides a stable permeate flux as well as exhibits excellent reusability in long-term cycling separation experiments and thus can be utilized for industrial oily wastewater treatment.

Manufacturing Example

1. Synthesis of F127-b-PDMS

Preparation: Pluronic F127 (polyethylene oxide-polypropylene oxide-polyethylene oxide triblock copolymer; PEO-PPO-PEO), ammonium cerium(IV) nitrate, nitric acid (70 wt %), sodium dodecyl sulfate (SDS, ACS reagent, ≥99.0%), N,N-dimethylformamide (DMF, anhydrous, 99.8%), N-methyl-pyrrolidone (NMP, anhydrous, 99.5%), and n-hexane (anhydrous, 95%) were all purchased from Sigma Chemical Co., USA. Vinyl terminated polydimethylsiloxane (DMS-V05, 800 g/mol) was purchased from Gelest Inc.

Polyethersulfone (PES, Gafone 3000P, Mw 62,000~64,000 g/mol) was purchased from Solvay Korea Co., Korea. N-pentane (HPLC grade) was purchased from Thermo Fisher Scientific, USA. Soybean oil was purchased from Ottogi Co., Ltd., Korea. Ethyl acetate was purchased from Daejung Chemicals and Metals Co., Korea. All the chemicals were used as they were without further purification.

First, F127 (1.0 g, 0.08 mmol) and CMS-V05 (1.5 g, 1.9 mmol) were emulsified with 16.0 mL of DI water by ultrasonication (BRANSONIC®, 8510R-DTH, USA) in a 48 mL pressure vessel (CG-1880, Chemglass Inc.) for 30 minutes.

Nitrogen gas was injected into the pressure vessel for 5 minutes to completely remove oxygen. During nitrogen injection, 4 mL of an initiator solution prepared by dissolving 0.4 mmol of Ce(IV) in 1.0 mol/L of nitric acid solution was added to the emulsified solution. After being sealed, the pressure vessel was additionally placed in an oil bath at 45° C. for 10 hours in a nitrogen atmosphere, and then exposed to air to prepare a milky white product. The milky white product was extracted with ethyl acetate, and the extracted aqueous phase was dialyzed against distilled water for 2 days using a dialysis membrane (standard RC tube, Mw cutoff of 12 to 14 kDa, Spectrum Laboratories, Inc., USA), and then finally dried using a freeze dryer to prepare F127-b-PDMS.

F127-b-PDMS was confirmed by Fourier transform infrared (FTIR, Nicolet iS10, Thermo Fisher Scientific, USA) together with "14" indicating the repeated unit number of PDMS determined by $^1$H NMR (JMTC-400, JASTEC Co., Japan) characteristics.

2. Manufacture of nanofiber membrane

PES and F127-b-PDMS were dissolved in a mixed solvent (DMF:NMP at weight ratio of 1:1) at room temperature for 1 day so that PES was contained at 25 wt % and F127-b-PDMS was contained at 0, 2.5, 5, 10, and 15 wt % with respect to the total weight. All nanofiber membranes were manufactured by performing electrospinning under the same setting conditions (supply rate: 0.5 mL/h, applied voltage: 11±1 kV, relative humidity: 50% to 60%) and collected into a flat type collector wrapped in aluminum foil. Next, the membranes were immersed in deionized water (DI) and then dried in an oven at 40° C. to manufacture nanofiber membranes to which F127-b-PDMS was applied. The nanofiber membranes manufactured according to Manufacturing Example contained F127-b-PDMS at 0 wt %, 2.5 wt %, 5 wt %, 10 wt % and 15 wt % and thus were hereinafter referred to as SSNM-0, SSNM-2.5, SSNM-5, SSNM-10, and SSNM-15.

EXPERIMENTAL EXAMPLE

The morphology of the membrane surface was detected using a scanning electron microscope (SEM, S-4700, Hitachi, Japan). The pore size distribution and average pore size of the membrane were measured using a capillary flow meter (CFP-1500AE, Porous Materials Inc., USA). The surface wettability of the nanofiber membrane was measured using a contact angle goniometer (Phoenix 300, Surface electrooptics, South Korea). The mechanical strength of the membrane was measured using Universal Testing Machine (UTM, TO-100-IC, Testone co., Ltd.). X-ray photoelectron spectroscopy (XPS, K-Alpa+, Thermo Fisher) was used to confirm the presence of F127-b-PDM on the surface of the nanofiber.

Underwater Emulsion Separation Experiment

Water and oil were mixed at a volume ratio of 1:50, the mixture was subjected to ultrasonication at a temperature of 25° C. to 30° C. for 1.5 hours to obtain a surfactant-free emulsion (SFE).

A material obtained by mixing SDS (0.1 mg/mL) emulsifier with oil and water (volume ratio 1:100) was subjected to ultrasonication for 1.5 hours to obtain a surfactant-stabilized emulsion (SSE).

In the study, a dead-end glass filter with stainless steel support (47 mm, LukeGL®, India) was used to evaluate the emulsion separation performance. Before emulsion separation was performed, the membrane was wet in advance and deionized water was filtered through the membrane to remove the entrained air. Subsequently, the emulsion was poured directly into the apparatus so as to be separated by gravity. During the separation process, the feed solution was kept at a certain level up to about 9 cm. The permeate flux was calculated by J=V/At, where J was the permeation amount, V was the permeation volume, A was the area of the membrane, and t was the separation time. For evaluation of the separation efficiency, a UV/V spectrophotometer (Optizen 2120UV, Mecasys Co., Ltd.) was applied to analyze the content of oil. The supplied emulsion and the filtered solution were imaged using an optical microscope (TE2000-U, Nikon Co, Tokyo, Japan), and the hydrodynamic diameters of oil droplets were measured by dynamic light scattering (DLS) spectrophotometry (ELS-8000, Otsuka Electronic Co., Japan). In a further study, the long-term performance of the membrane was evaluated using Amicon Stirred Cell (Model 8200, EMD Millipore, USA).

FIGS. 5A to 5F are SEM images and property graphs of nanofiber membranes depending on the content of F127-b-PDMS according to an embodiment of the present invention.

Referring to FIGS. 5A to 5F, (a) to (e) the average diameter of the nanofibers increases from 935±146 nm to 1077±184 nm as the content of F127-b-PDMS that is an amphiphilic triblock copolymer increases from 0 w % to 2.5 w %, 5 w %, 10 w %, and 15 w %. This increase in diameter is due to an increase in the viscosity of the solution due to the high concentration of the copolymer. Furthermore, the larger nanofiber diameter leads to a decrease in the density of the intersecting nanofibers under a certain volume fraction of the copolymer, and thus the pore size of the membrane is generally larger. (f) The pore size distribution of the membranes with different concentrations of F127-b-PDMS varied from 1.5 μm to 2.0 μm, and as a result, the pore size of the membrane tends to increase as the concentration of the polymer increases as presented in the following Table 1.

TABLE 1

|  | SSNM-0 | SSNM-5 | SSNM-10 | SSNM-15 |
| --- | --- | --- | --- | --- |
| Mean Flow Pore Diameter | 1.7675 | 1.9972 | 2.1083 | 2.2092 |
| Maximum Pore Size | 3.4042 | 3.9473 | 4.3844 | 4.6523 |

According to Table 1, the different permeability of air-in-water and oil-in-water through nanofibrous membranes can be explained by the estimation of the intrusion pressure ($P_c$) based on Laplace theory and simplified geometry.

$$P_c = -2\gamma \cos \theta / R$$

Where Δp is the liquid intrusion pressure, γ is the surface tension of water in air or the interfacial tension between oil and water, θ is the advancing contact angle of the liquid on the fiber surface, and R is the maximum pore radius of the membrane.

FIGS. 6A to 6I are graphs illustrating the surface composition of surface segregation nanofiber membranes (SSNM) according to an embodiment of the present invention.

Referring to FIGS. 6A to 6I, (a) the mapping of Si element clearly shows that the F127-b-PDMS amphiphilic triblock copolymer covers the surface of the PES nanofibers with certain distribution. When a more amount of F127-b-PDMS copolymer was added, the Si content analyzed by EDS increased from 0% to 4.57%. Moreover, the presence of F127-b-PDMS on the SSNM surface was confirmed by the results on the properties by FT-IR and XPS. (b) In order to confirm the success of surface modification, the FT-IR spectrum may be acquired before and after the addition of F127-b-PDMS copolymer. C—Si—C elongation vibration from PDMS was confirmed in the 800 cm$^{-1}$ band, and the peak corresponding to the asymmetric elongation vibration of Si—O—Si bond was confirmed in the region of 1000 cm$^{-1}$ to 1100 cm$^{-1}$. (c) The XPS results show the evidence that the peak of Si 2p is positioned at a binding energy of about 102.37 eV, which indicates the presence of F127-b-PDMS copolymer on the nanofiber membrane. In order to find out the surface composition in more detail, the XPS C1 core-level spectrum was fitted by shape analysis using the Gaussian fitting function. (d) and (e) The molar ratio of PDMS in the copolymers can be calculated from the intensity ratio of the proton peak between F127 ($I_c$) and PDMS ($I_{a+b}$) in the $^1$H NMR spectrum. Each PPO has one —CH$_3$ group, and each PDMS has twenty —CH$_3$ groups. The number of PDMS units (n) in each polymer F127-b-PDMSn was calculated by the following equation.

$$n = [I_{a+b}/(3 \times 20)] / [I_c/(3 \times 65)]$$

Where $I_{a+b}$ and $I_c$ are the intensities of the a+b and c proton peaks, respectively.

(f) to (i) Only PDMS has a C—Si bond, and the proportion of PDMS ($\Phi$PDMS, degree of surface segregation) covering the surface of SSNM can be calculated as follows.

$$\Phi PDMS = C\% \times [(A_{C-Si}/A_{C-Si} + A_{C-O} + A_{C-C(H)})/0.5]$$

Where $A_{C-Si}$, $A_{C-O}$, and $A_{C-C(H)}$ are fitted with C—Si, C—O(S) and C—C(H) peaks, respectively. The coefficient of 0.5 is the theoretical atomic ratio of C(—Si) in each Si(CH$_3$)$_2$—O repeating unit. The proportions of PDMS ($\Phi$PDMS, degree of surface segregation) covering the surface of SSNM-2.5, SSNM-5, SSNM-10, and SSNM-15 are 10.04%, 12.36%, 17.22%, and 18.68%, respectively. Hence, as the amphiphilic copolymer is added, a wider area of the surface of the nanofiber membrane is covered, and this indicates that SSNM has a high degree of surface segregation.

FIGS. 7A to 7F are graphs illustrating the selective wettability of surface segregation nanofiber membranes (SSNM) according to an embodiment of the present invention.

Referring to FIGS. 7A to 7F, in the case of an oil/water separation material, the wettability is a key factor for evaluating the selection performance. (a) It shows that the water contact angle of SSNM in air is greater (that is, SSNM is more hydrophobic) and has a positive correlation with the concentration of F127-b-PDMS copolymer. As a result, highly non-polar PDMS segments are enriched on the surface of the nanofibers, and the surface energy of the membrane decreases. SSNM exhibited hydrophilicity after being completely wet (wet) by vacuum filtration of deionized water, and this is the opposite result as compared with that of the non-wet SSNM. (b) It shows wet SSNM having a low water contact angle (WCA) after filtration. When being compared with SSNM-0 having a WCA of 47.0°, WCA of other SSNMs is 35° or less, particularly WCA of SSNM-15 is as low as 27.18°. (c) WCA decreases to 0° in 3 seconds. The excellent hydrophilicity of this SSNM is due to the hydration layer formed on the PEO segment of the wet SSNM. Because of the hydration layer which increases the polar force of the surface tension ($Y_s^p$) of the membrane, polar water molecules are attracted and easily pass through the PDMS segments. Hence, SSNM exhibits favorable hydrophilicity after prewetting. Such a SSNM exhibiting hydrophilicity is capable of separating oil-in-water emulsions. (d) In order to evaluate the selective wettability of SSNM, the static underwater oil contact angle (UWOCA) was analyzed. As the concentration of F127-b-PDMS increased, static UWOCA increased from 120.5° to 144.9° while typical oil-repellent properties were exhibited. Meanwhile, (e) advancing and receding UWOCA were studied in order to characterize the oil adhesion force on the SSNM surface. As a more amount of F127-b-PDMS was added, the difference between the advancing angle and the receding angle decreased. The equilibrium was achieved when the concentration of F127-b-PDMS was 10 wt % (SSNM-10) and the advancing and receding UWOCA were 144.0° and 140.2°, respectively. The equilibrium is determined by the adhesion forces of SSNM-10 (9.49 μN) and SSNM-15 (6.65 μN), which are as small as to be a half or less time that of SSNM-5 (20.07 μN). The calculated adhesion forces of SSNM-10 and SSNM-15 indicated low adhesion force between the surface of the membrane and the oil droplet. This positively acts on the surface segregation behavior by enhancing the underwater oleophobicity and low oil adhesion force of SSNM unlike the relatively low static UWOCA (120.5°) and high adhesion force (41.73 μN) obtained by the initial PES nanofiber membrane (SSNM-0). The underwater oil adhesion force of the SSNM surface may be calculated as follows based on the advancing and receding UWOCA.

$$Fa = (2/\eta)\gamma_{ow}D_c(\cos\theta_R - \cos\theta_A)$$

$$Dc = 2(6V/\pi)^{1/3}\{\tan(\theta_A/2)[3 + \tan^2(\theta_A/2)]\}^{-1/3}$$

Where Fa is the underwater oil adhesion force, $\gamma_{ow}$ is the interfacial tension between oil and water, Dc is the contact diameter, $\theta_A$ is the advancing contact angle, $\theta_R$ is the receding contact angle, and V is the volume of the droplet (10 μL).

(f) It shows a schematic diagram of the underwater oleophobicity of the "surface segregation" of a nanofiber membrane. Two aspects can contribute to the results. First, the random orientation of nanofibers imparted adequate roughness and decreased the contact area between the oil droplet and the membrane surface. Second, the low surface energy layer formed of the PDMS segment and the hydration layer formed of the PEO segment prevented the PES nanofibers from directly coming into contact with the oil droplets.

FIGS. 8A to 8E are graphs illustrating the oil-in-water emulsion separation performance of SSNM according to an embodiment of the present invention.

Referring to FIGS. 8A to 8E, the surface segregation nanofiber membrane should have the desired capacity to treat different types of oil-in-water emulsions. Hence, in order to evaluate the separation performance of SSNM, a surfactant-free emulsion (SFE) and a surfactant-stabilized emulsion (SSE) stabilized with surfactant derived from n-hexane were used. (a) SFE was successfully separated by high hexane removal. The hexane removal rate slightly increased from 99.31% to 99.61%, and the separation efficiencies by SSNMs having different amphiphilic copolymer concentrations remain relatively stable. In particular, the separation efficiency of SFE by SSNM-0 was higher than expected. In contrast, (b) the separation efficiency of SSE by SSNM-0 was relatively low, and the removal of hexane from SSE remarkably increased as the concentration of the copolymer increased. The difference in separation efficiency between SFE and SSE may be attributed to three reasons: first, the mean flow pore size of SSNM, second, the degree of surface segregation of nanofiber membranes, and third, the collision-solidification process of SFE and SSE oil droplets. (c) The mean flow pore size of SSNM-0 is 1.77 μm, and this is smaller than the oil droplet size of SFE, 1.95 μm, but larger than the oil droplet size of SSE, 1.34 μm. The hexane removal rate by SSNM-0 was 99.31% for SFE and 89.30% for SSE, respectively. This revealed that the separation efficiency by SSNM-0 is greatly dependent on the sieving effect that is the basis of the pore structure. Conversely, referring to Table 1, the separation efficiency was more favorable even though the mean flow pore size was increased. This is due to the oil resistant performance of other SSNMs due to the high degree of surface segregation. The high covering range of PDMS and PEO can provide the low surface energy and hydration layer of SSNM, and thus a stable oil-solid interface can be formed to improve underwater oleophobicity. In addition, the difference in the collision-aggregation process between SFE and SSE oil droplets affects the separation efficiency. When SFE is filtered through SSNM, SFE oil droplets stand on the surface with high oil contact angles and coalesce by the excellent oil resistant performance of the surface segregation. Once the diameter of the coalesced droplets becomes sufficiently large, the oil droplets are easily separated from the membrane surface and demulsified to form free oil according to the Stoke law. However, SSE oil droplets surrounded by the surfactant SDS tend to disperse and form an oil cake layer containing small oil droplets instead of aggregation. These small oil droplets eventually easily leak into the filtrate. The oil cake layer on the surface of SSNM also contributes to the low permeate flux of SSE. Overall, the flux (3792 $Lm^{-2}h^1$ to 6634 $Lm^{-2}h^1$) of SFE was higher than the flux (766 $Lm^{-2}h^1$ to 1430 $Lm^{-2}h^1$) of SSE. This difference is due to the formation of an oil cake layer, which becomes a barrier that prevents SSE from passing through the membrane, during filtration of SSE. The permeate fluxes of both SFE and SSE increase in the order of from SSNM-1 to SSNM-10. According to the Hagen-poiseuille method, the increase in the flux through SSNM is due to the increase in the mean flow pore size, and this allows water to pass through more favorably. On the other hand, a relatively low permeate flux is obtained in the case of SSNM-15, and this is due to the oil intrusion pressure that is a synthetic effect derived from the pore size and the underwater contact angle. (d) As more amount of the amphiphilic copolymer is added, $\Phi$PDMS (covering range of PDMS in SSNM) increases as presented in the following Table 2, a higher oil intrusion pressure is provided, and the oil droplets more hardly intrude into the membrane.

TABLE 2

|       | SSNM-2.5 | SSNM-5 | SSNM-10 | SSNM-15 |
|-------|----------|--------|---------|---------|
| TPDMS | 10.04    | 12.36  | 17.22   | 18.68   |

However, in the case of SSNM-15 having a large maximum pore size, the oil intrusion pressure decreased, this caused oil droplets to intrude and block the pores, and as a result, the permeate flux decreased and the oil rejection was relatively low. Consequently, SSNM-10 is an optimal membrane which has the most favorable permeate flux and hexane removal rate. (e) SFE and SSE before and after separation can be observed under an optical microscope. The supplied milky white emulsion changed to transparent water after being filtered through SSNM-10, and this indicates excellent separation performance of the membrane.

FIGS. 9A to 9F are graphs illustrating the permeate flux through SSNM in various situations according to an embodiment of the present invention.

Referring to FIGS. 9A to 9F, (a) in order to demonstrate the additional separation performance of SSNM-10, various oil-in-water emulsions derived from different kinds of oil were evaluated. SFE included petroleum ether-in-water, pentane-in-water, and soybean-in-water. Similarly, the same oil was used in SSE but SDS was used as the surfactant in this emulsion. The permeate fluxes of petroleum ether-in-water SFE, pentane-in-water SFE, soybean-in-water SFE, petroleum ether-in-water SSE, pentane-in-water SSE, and soybean-in-water SSE were 7115, 7092, 6298, 1760, 1931, and 995 $Lm^{-2}h^{-1}$, respectively. The different fluxes of these emulsions are due to the different viscosities and oil droplet contents. Here, SSNM-10 provides a high flux as well as a high oil rejection of 99.18% for SFE and 98.95% for SSE in the case of pentane-in-water emulsion. Although the oil rejection of other emulsions is somewhat low, the separation efficiency may be 97.27% or more, and this demonstrates the excellent separation performance of SSNM for various types of oil. (b) The performance of SSNM was compared with the SSE separation performance of other latest nanofiber membranes, and it can be seen that SSNM having a superior emulsion flux can compete with other existing membranes even under an ultra-low driving force by gravity of 0.9 kPa or less. These results are due to the high porosity of the nanofiber membrane as well as the oil resistant performance derived from the surface segregation behavior of the nanofiber. (c) Cycling separation test was also performed in order to evaluate the reusability of SSNM. It can be seen that the permeate flux is significantly decreased after 1 minute by the formation of an oil cake layer. As the separation time increased, the permeate flux decreased, and the permeate flux was 55% of the initial permeate flux after one cycle (5 minutes). However, the permeate flux was completely recovered after simple washing of the membrane with deionized water. During the ten cycles (50 min) test, SSNM maintained excellent flux recovery, indicating excellent oil resistance by the abundant hydrophilic PEO segments on the nanofiber surface. During the entire process, the separation efficiency was as stable as 99.5% or more. (d) and (e) The oil release properties of SSNM were tested using another dead-end filter with a stirrer. During the separation process, the stirrer maintained a constant speed of 200 rpm and the applied pressure was maintained at about 1 kPa similar to gravity. In fact, the magnetic stirrer of the dead-end filter was applied in order to provide a hydrodynamic force capable of removing oil droplets and preventing the formation of an oil cake layer. (f) The permeate flux slightly decreased after 60 minutes filtration but was still excellent and was maintained at 75% of the initial permeate flux without the aid of a stirrer. This can be explained by the PDMS segment having low surface energy on the nanofiber surface, which prevents adhesion, spreads oil droplets, and promotes rapid release of accumulated oil by the hydrodynamic force provided by stirring. In addition, oil rejection of 99.10% or more can be obtained. This indicates that the excellent oil release properties of SSNM having surface segregation properties are to slow the formation of an oil cake layer on the membrane surface and thus increase the separation efficiency.

The membrane according to an embodiment of the present invention simultaneously exhibits hydrophilicity, underwater oleophobicity, and low oil adhesion force, thus has surface segregation properties, and as a result, has an excellent oil permeate flux, exhibits antifouling properties, and can excellently separate oil in water. The membrane does not contain fluorine (F) and thus is not harmful and may be environmentally friendly.

The membrane according to an embodiment of the present invention simultaneously exhibits hydrophilicity, underwater oleophobicity, and low oil adhesion force, thus has surface segregation properties, and as a result, has an excellent oil permeate flux, exhibits antifouling properties, and can excellently separate oil in water.

The membrane does not contain fluorine (F) and thus is not harmful and may be environmentally friendly.

The effects of the present invention are not limited to the above effects, and should be understood to include all effects that can be deduced from the configuration of the invention described in the detailed description or claims of the present invention.

The above description of the present invention is for illustrative purposes only, and those skilled in the art to which the present invention pertains will understand that the present invention can be easily modified into other specific forms without changing the technical spirit or essential features of the present invention. Hence, it should be understood that the embodiments described above are illustrative and non-limiting in all respects. For example, each component described as a single type may be implemented in a distributed manner, and similarly, components described as being distributed may also be implemented in a combined form.

The scope of the present invention is indicated by the claims to be described later, and all changes or modified forms derived from the meaning and scope of the claims and their equivalent concepts should be construed as being included in the scope of the present invention.

What is claimed is:

1. A nanofiber membrane comprising:
 a polymer nanofiber; and
 an amphiphilic triblock copolymer bonded to a surface of the polymer nanofiber, wherein
 the amphiphilic triblock copolymer includes a hydrophobic portion; hydrophilic portions positioned at both ends of the hydrophobic portion; and a low surface energy portion positioned at one end of each of the hydrophilic portions positioned at both ends of the hydrophobic portion, and
 the hydrophobic portion of the amphiphilic triblock copolymer is bonded to the surface of the polymer nanofiber and the hydrophilic portion and the low surface energy portion are exposed to outside of the surface of the polymer nanofiber.

2. The nanofiber membrane according to claim 1, wherein the polymer nanofiber includes a polysulfone-based polymer.

3. The nanofiber membrane according to claim 1, wherein the hydrophobic portion of the amphiphilic triblock copolymer is one selected from the group consisting of poly(propylene oxide) (PPO), polyvinylidene fluoride (PVDF), and polysulfone (PSF).

4. The nanofiber membrane according to claim 1, wherein the hydrophilic portion of the amphiphilic triblock copolymer is one selected from the group consisting of poly(ethylene oxide) (PEO), polyvinylpyrrolidone (PVP), and polymethacrylic acid (PMAA).

5. The nanofiber membrane according to claim 1, wherein the low surface energy portion of the amphiphilic triblock copolymer is one selected from the group consisting of polydimethylsiloxane (PDMS), poly(hexafluorobutyl methacrylate) (PHFBM), poly(hexafluorobutyl acrylate) (PHFBA), and poly(dodecafluoroheptyl methacrylate) (PDFHM).

6. The nanofiber membrane according to claim 1, wherein a weight ratio of the polymer nanofiber to the amphiphilic triblock copolymer is 1:0.025 to 1:0.15.

7. The nanofiber membrane according to claim 1, wherein a ratio occupied by the low surface energy portion is 5% to 20% of an entire surface area of the polymer nanofiber.

8. The nanofiber membrane according to claim 1, wherein the amphiphilic triblock copolymer has a water contact angle of 50° or less and an underwater oil contact angle of 110° or more.

9. A method for manufacturing a nanofiber membrane, the method comprising:
 mixing an amphiphilic triblock copolymer and a polymer material with an organic solvent to form a mixture;
 subjecting the mixture to electrospinning to form a nanofiber; and
 immersing the nanofiber in distilled water and then drying the nanofiber, wherein
 the amphiphilic triblock copolymer includes a hydrophobic portion; hydrophilic portions positioned at both ends of the hydrophobic portion; and a low surface energy portion positioned at one end of each of the hydrophilic portions positioned at both ends of the hydrophobic portion.

10. The method for manufacturing a nanofiber membrane according to claim 9, wherein the hydrophobic portion of the amphiphilic triblock copolymer is one selected from the group consisting of poly(propylene oxide) (PPO), polyvinylidene fluoride (PVDF), and polysulfone (PSF).

11. The method for manufacturing a nanofiber membrane according to claim 9, wherein the hydrophilic portion of the amphiphilic triblock copolymer is one selected from the group consisting of poly(ethylene oxide) (PEO), polyvinylpyrrolidone (PVP), and polymethacrylic acid (PMAA).

12. The method for manufacturing a nanofiber membrane according to claim 9, wherein the low surface energy portion of the amphiphilic triblock copolymer is one selected from the group consisting of polydimethylsiloxane (PDMS), poly(hexafluorobutyl methacrylate) (PHFBM), poly(hexafluorobutyl acrylate) (PHFBA), and poly(dodecafluoroheptyl methacrylate) (PDFHM).

13. The method for manufacturing a nanofiber membrane according to claim 9, wherein the polymer material includes a polysulfone-based polymer.

14. The method for manufacturing a nanofiber membrane according to claim 9, wherein the organic solvent includes one or more selected from the group consisting of N-methyl-2-pyrrolidone (NMP), dimethylformamide (DMF), dimethylsulfoxide (DMSO), and N,N-dimethylacetamide (DMAc).

15. The method for manufacturing a nanofiber membrane according to claim 9, wherein a content of the amphiphilic triblock copolymer is more than 0 wt % and 15 wt % or less with respect to a total weight of the mixture.

16. The method for manufacturing a nanofiber membrane according to claim 9, wherein a content of the polymer material is 20 wt % to 30 wt % with respect to a total weight of the mixture.

* * * * *